(12) United States Patent
Hannum et al.

(10) Patent No.: US 8,707,376 B1
(45) Date of Patent: Apr. 22, 2014

(54) CONVENIENT VIDEO PROGRAM START OVER SYSTEM AND METHOD FOR A VIDEO ENTERTAINMENT DISTRIBUTION NETWORK

(75) Inventors: Sandi Hannum, Philadelphia, PA (US); Peter Sheedy, Huntington Valley, PA (US); James R. Albrecht, Girdwood, AK (US); Matt Wong, Palo Alto, CA (US); Bruce R. Bradley, Wayne, PA (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 1270 days.

(21) Appl. No.: 11/186,170

(22) Filed: Jul. 21, 2005

Related U.S. Application Data

(60) Provisional application No. 60/590,056, filed on Jul. 21, 2004.

(51) Int. Cl.
*H04N 7/173* (2011.01)
*H04N 5/76* (2006.01)
*H04N 5/78* (2006.01)

(52) U.S. Cl.
USPC .............. 725/88; 725/102; 386/324; 386/341

(58) Field of Classification Search
USPC ........................................................ 725/114
See application file for complete search history.

(56) References Cited

U.S. PATENT DOCUMENTS

| | | | |
|---|---|---|---|
| 5,477,263 A | 12/1995 | O'Callaghan et al. | |
| 6,571,390 B1 * | 5/2003 | Dunn et al. | 725/52 |
| 6,608,966 B1 | 8/2003 | Anderson et al. | |
| 6,609,253 B1 | 8/2003 | Swix et al. | |
| 6,721,955 B2 | 4/2004 | Khoo et al. | |
| 7,024,678 B2 * | 4/2006 | Gordon et al. | 725/88 |
| 7,228,559 B1 * | 6/2007 | Sie et al. | 725/88 |
| 7,343,141 B2 * | 3/2008 | Ellis et al. | 455/132 |
| 2001/0042246 A1 * | 11/2001 | Yuen et al. | 725/1 |
| 2001/0056578 A1 * | 12/2001 | Hwang et al. | 725/98 |
| 2002/0032905 A1 * | 3/2002 | Sherr et al. | 725/38 |
| 2003/0126197 A1 * | 7/2003 | Black et al. | 709/203 |
| 2004/0172654 A1 * | 9/2004 | Pei et al. | 725/96 |
| 2004/0221311 A1 * | 11/2004 | Dow et al. | 725/52 |
| 2004/0228345 A1 * | 11/2004 | Cho et al. | 370/395.1 |
| 2005/0160465 A1 * | 7/2005 | Walker | 725/86 |
| 2006/0280443 A1 * | 12/2006 | Horii | 386/95 |
| 2008/0250456 A1 * | 10/2008 | Gervais et al. | 725/54 |
| 2010/0095325 A1 * | 4/2010 | Urdang et al. | 725/32 |

* cited by examiner

*Primary Examiner* — Ricky Chin
(74) *Attorney, Agent, or Firm* — Banner & Witcoff, Ltd.

(57) ABSTRACT

A system and method are described herein for providing an convenient video program start over system and method for a video entertainment distribution network whereby a user may interactively revert back to the beginning of an ongoing video program that is currently broadcasted over the video distribution network. The novel system and method may be implemented on any video network having interactive television (ITV) capabilities, wherein user requests from a client are serviceable at an upstream head end, and video storage means exist for the purpose of storage of time based broadcast video programs. The system preferably utilizes a process that involves a minimally complicated sequence of commands that are easily understood and remembered by virtually any user, thereby enhancing the probability of consumer acceptance. The start over system and method may be embodied as a program of instructions, defining a controller, that are executed by a micro-processor located in the STB (client) or head end (server). Optional means are also provided for allowing only a subset of all available broadcast video programs that emanate from a plurality of programming sources to be used with the start over system.

39 Claims, 5 Drawing Sheets

START OVER SYSTEM LOOKUP TABLE

| PROGRAM NAME | PROGRAMMING SOURCE (CHANNEL) | CURRENTLY ACCESSED FLAG |
|---|---|---|
| THE PATRIOT | 02 | 1 |
| FORREST GUMP | 58 | 0 |
| THE DEEP | 58 | 1 |
| BAD NEWS BEARS | 34 | 1 |
| ⋮ | ⋮ | ⋮ |

PROGRAMMING SOURCE START OVER ENABLEMENT TABLE

| PROGRAM NAME |
|---|
| THE PATRIOT |
| FORREST GUMP |
| THE DEEP |
| BAD NEWS BEARS |
| ⋮ |

FIG. 7a

PID START OVER ENABLEMENT TABLE

| PROGRAMMING SOURCE (CHANNEL) |
|---|
| 04 |
| 58 |
| 34 |
| 68 |
| ⋮ |

FIG. 7b

CONVENIENT VIDEO PROGRAM START OVER SYSTEM AND METHOD FOR A VIDEO ENTERTAINMENT DISTRIBUTION NETWORK

BACKGROUND TO RELATED APPLICATIONS

This application claims priority under 35 U.S.C. 119(e) on U.S. Provisional application No. 60/590,056 Entitled "ONE TOUCH, START OVER", filed on Jul. 21, 2004, by James R. Albrecht, et al.

FIELD OF THE INVENTION

This invention relates generally to interactive television systems providing DVD-like functionality, and more specifically, to a system which enables the instantaneous replay from the start of a partially elapsed program emanating from a conventional programming source using an convenient minimally interactive procedure.

BACKGROUND OF THE INVENTION

Historically, television programming sources provided multi-media entertainment to the consumer public over an aerial broadcast medium such that individual program offerings were supplied only at predetermined times as determined by the programming source. With this constraint, a consumer was essentially forced to modify his or her personal schedule in order to view the desired program at the prespecified time. The advent of video cassette recorders (VCRs), and other similar video recording devices such as digital versatile disks (DVDs), and TiVO™ brand digital video recording (DVR) equipment have alleviated this problem somewhat by allowing the user to record programs from a broadcast channel for personal viewing at a later time. Nevertheless, this flexibility requires that the user maintain a proactive knowledge base of future programming in order to avoid missing an interesting program altogether. The multi-media entertainment generally consists of video portion and an associated audio portion (hereinafter to be collectively termed video), which is typically delineated into multiple video programs, each spanning a predetermined amount of time.

Traditional television broadcast offerings consisted of relatively few choices in concurrent video programs from which a user simply chose between a very short list of program alternatives for view at any particular time. Nevertheless, television programming sources have since burgeoned into a rather large industry, wherein today's cable access television (CATV), and direct broadcast satellite (DBS) systems provide over a hundred channels, which are available for viewing at any given time. Given this rather large selection of viewing options, a phenomenon, commonly known as "channel surfing", has developed whereby the user alternatively views each of the available channels at a somewhat rapid pace in order to find an interesting program. This makeshift mode of program selection does abate the necessity of maintaining an active knowledge of future programming, yet the initial portions of the video programs are almost always invariably missed due to the fact that the user is only able to obtain knowledge of the ongoing program after it has been playing for some predetermined amount of time.

Advances in video technology have provided for various types of video on demand (VoD) services, which have generally increased the level of interactivity that a user may have with their television viewing experience. Whereas viewing options historically available to the user only consisted of switching among the different channel offerings, VoD has provided such services as Pay-Per-View™, wherein a user may order and view video programs from the CATV provider. Another service that has been proposed for use within a VoD environment is VCR-like functionality, wherein the user is allowed to interactively fast-forward, reverse, pause, or stop an ongoing video program. U.S. Pat. No. 6,609,253 to Swix, et al. describes one such device wherein a method is disclosed for managing potential bandwidth problems that are created while providing VCR-like functionality within a typical VoD system. U.S. Pat. No. 6,608,966 to Anderson, et al. describes a method of canceling selected frames from a conventional MPEG-2 video stream in order to enable fast-forward, and reverse functionality. The '966 and '253 devices, however, are defined for use only with stored video assets; rewinding to an earlier portion of an ongoing video program is not enabled using the teachings described therein.

U.S. Pat. No. 5,477,263 to O'Callaghan does describe a device which provides for rewind functionality to an ongoing program by the creation of duplicate copies of an ongoing program that are stored in a time-staggered fashion such that a user may interactively reverse, pause, or fast-forward through the video program via alternative access to either of these time-staggered video assets. However, no means are disclosed for quickly reverting back to the beginning of the ongoing program. Furthermore, it is contemplated that such a system that enables rewind to the start of a relatively long program would unduly tax the storage requirements of a typical VoD system as well unduly burden multi-media transport mediums such as currently implemented coaxial cable or hybrid fiber cable (HFC) distribution lines having only a finite amount of available bandwidth.

Typical users of consumer products will not make use of an available function of that product if the use of that functionality requires a complicated sequence of steps or actions. That is, consumer acceptance is closely associated with simplicity of use. Rewind functionality provided by the '263 device is available for ongoing programming, however no means are disclosed for easily, and quickly finding the beginning of the ongoing program using a simple "start over" procedure. The act of rewinding a program while "channel surfing" is a burdensome task wherein the user is required to rewind the program in an iterative fashion until the starting location is found. It is projected that a typical "channel surfer", who is characteristically known as a whimsical viewer, would forgo the use of such a device rather than go through the involved procedure of finding the actual beginning of any given program. Throughout the rest of this document, the term "start over" will be used to denote the action of returning the program to its starting location and subsequently beginning play therefrom.

Thus there has remained a long-felt, unsatisfied need for a system which implements "start over" functionality to an ongoing program of a conventional video distribution system, whereby play of an ongoing video program may be initiated from the start thereof utilizing a process that involves a minimally complicated sequence of commands.

SUMMARY OF THE INVENTION AND OBJECTIVES

The present invention provides a solution to these needs, as well as other needs, via a convenient video program start over system and method for a video entertainment distribution network whereby a user may interactively revert back to the beginning of an ongoing video program that is currently being broadcast over the video distribution network. With this system, a user who has inadvertently missed a portion of a currently broadcasted video program may interactively instruct the network to replay the entire program from the beginning thereof using a simple, minimally interactive procedure.

The present system is particularly suited for entertainment video distribution networks having a video data mass storage device that is adapted for the interactive storage and retrieval of selected streams of video data from a programming source. Such systems may include community access TV (CATV, also known as cable television), direct broadcast satellite (DBS) distribution networks having interactive television (ITV) capabilities, or may even be comprised of a system having an interactively controlled mass storage system located at the customer premises such as TiVO™ brand digital video recording (DVR) equipment. An interactive television (ITV) enabled network defined as pertaining to this disclosure, is the ability of a server device such as a head end to receive and process upstream requests from a distally located client device such as a conventional set top box (STB) and thus manipulate video data which is sent downstream to the STB corresponding to those requests. ITV functionality is typically provided in a video distribution network via a conventional type of system which is commonly referred to as a navigator. The navigator, among other services, provides a means of handling human interaction with the network in a preferably ergonomic manner, and processes requests from the user, then forwards these requests to the upstream server or head end. The navigator is preferably a micro-processor driven algorithm which is executed by a plurality of stored program instructions located either in the head end or STB.

The present invention provides a user interface which is simple and convenient, thereby enhancing the probability of acceptance by a user. The system preferably utilizes a process that involves a minimally complicated sequence of commands that are easily understood and remembered by virtually any user. The convenient, minimally interactive procedure may be defined as any user interactive set of user commands that involves a minimally complicated sequence of user operations to initiate the start over system. As it is well known that systems which require a multiple sequence of actions are not easily remembered, the start over system preferably provides an intuitive operation requiring preferably only one-step from a user terminal such as a television style remote in order to initiate the start over operation.

It is therefore an object of the present invention is to provide an convenient use video program start over system and method for a video entertainment distribution network that enables an associated video program that is currently playing on said network to be played from the beginning of said video program.

Another object of the present invention is to provide an convenient video program start over system and method for a video entertainment distribution network which is adapted for use in any type of network having interactive television (ITV) capabilities.

Another object of the present invention is to provide an convenient video program start over system and method for a video entertainment distribution network having a user interface which requires a minimal number of user steps in order to initiate the start over operation.

Another object of the present invention is to provide an convenient video program start over system and method for a video entertainment distribution network, wherein optional means are provided to allow a programming source to determine which of its particular video programs are to be start over enabled.

These and other objects of the present invention will become readily apparent to those familiar with current video distribution principles and will become apparent in the following portions of the specification, wherein the detailed description is for the purpose of fully disclosing preferred embodiments of the invention without placing limitations thereon.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers, and wherein:

FIG. 6 is a simplified example of the start over lookup table of the present invention.

FIG. 7A is a simplified example of the programming source start over enablement table of the present invention.

FIG. 7B is a simplified example of the program ID start over enablement table of the present invention.

DETAILED DESCRIPTION OF THE PREFERRED EMBODIMENTS

Figure 1:
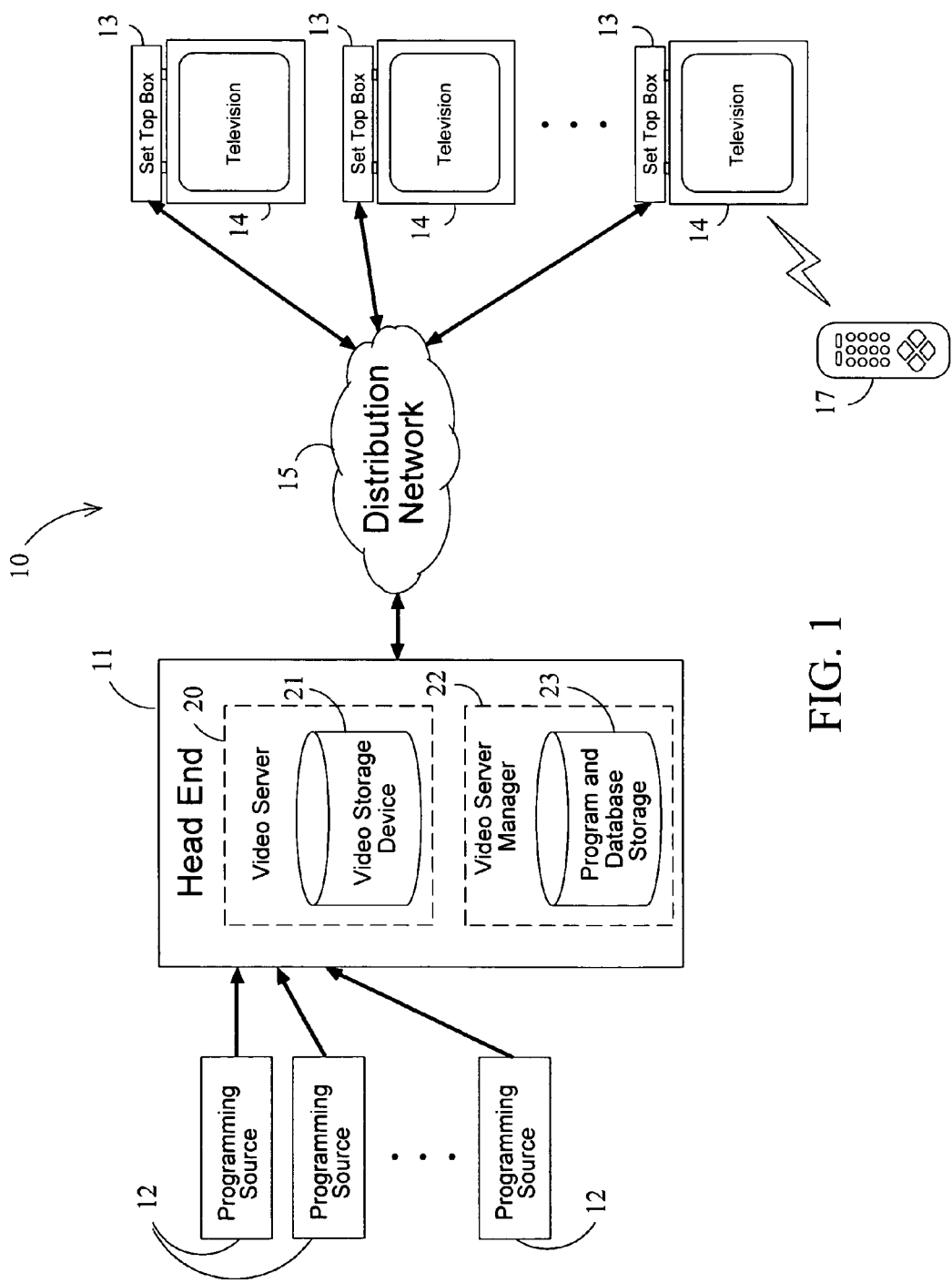
FIG. 1 is a block diagram of some of the principle components of a typical video distribution system having interactive television capabilities.

Referring now to the drawings, FIG. 1 shows a generic diagrammatic view of a video entertainment distribution network system having interactive television (ITV) capabilities 10. The system generally comprises a head end 11 which processes broadcast video programs and other programming services emanating from a plurality of programming sources 12 and forwards these video programs onward to a client device such as a typical set top box (STB). Each STB 13 is operable to control which programs are shown on their associated display such as a conventional television 14, and outputs commonly used NTSC, PAL, or SECAM formatted signals to the television set. The distribution network 15 is typically comprised of a lattice of coaxial cable lines or hybrid-fiber-cable (HFC) for connectivity of the head end to the plurality of STBs in the network, and may also include a plurality of broadcast centers or nodes that each service a subset of STBs within a small demographic area. Although a conventional television was cited as a specific type of display, it is to be appreciated that the present system may be implemented with any display defining a consumer electronic display device such as a PDA, a cellular telephone, a television, a personal computer, a laptop computer, and the like.

It is noted that the network, as shown in FIG. 1, shows a conventional video entertainment distribution network having a head end that distributes video information to a plurality of STBs. However, as is apparent to one skilled in the art, the head end and STBs interconnected to the distribution network may, in fact, be an internet server and a client such as a conventional personal computer respectively. That is, the start over system of the present invention may also be implemented on an internet network, or any other network having a head end (server) and STB (client) configuration.

User input is typically accomplished in an ITV enabled network system via a remote control device 17, which transmits individual keystroke commands via infrared (IR), Radio Frequency (RF), or other aerially transmittable signals to the STB. However, it is to be appreciated that user input may also be accomplished via a personal computer or other similar type device having user input means, which is interconnected to the network. Upstream signaling of user requests are typically provided in a video distribution network via a conventional type of system commonly referred to as a navigator. The navigator, among other services, provides a means of handling human interaction with the network in a preferably ergonomic manner, and processes requests from the user to the upstream server or head end. The navigator is preferably a micro-processor driven algorithm which is executed by a plurality of stored program instructions located either in the head end or STB.

The head end 11 of a typical ITV enabled system also includes a video server 20, which is capable of storing a plurality of video programs for view at a user specified time. The server 20 is operable to process multiple incoming requests from a plurality of users at the same time, and delegates the necessary bandwidth for a requested stored video program for transmission to the user, wherein such a service that is provided to the user is commonly referred to as Video-On-Demand (VoD). In order to facilitate storage requirements for such a system, a video storage device 21 is included therein, which may consist of one or an array of magnetic disks, optical disks, or servers based on RAM technology. Additionally, an video server manager 22 is also included that controls access to content stored in the video server 20 and has an associated program and database storage 23, which houses user information, stored video programs, or other fields of information that are used by the ITV system.

Historically, the incoming video stream contained a plurality of concurrent programming sources which were frequency division multiplexed onto a coaxial or fiber optic cable within a video distribution network, each requiring approximately 6 to 8 MHz of bandwidth. However, newer technologies have enabled digitization of the video stream, wherein individual video programs transmitted through the distribution network may be encapsulated within formats such as MPEG, MPEG-2, IP over DOCSIS, and the like. The newer digitized video formats have been very conducive to enabling ITV functionality in that upstream signaling (e.g. information which is sent from the STB to the head end) is accomplished using in-band signaling. Conversely, the older frequency division multiplexed systems did not provide for 2-way signaling within the distribution infrastructure, thus full ITV functionality was not possible with these systems. Additionally, television entertainment distribution systems utilizing satellite transmissions, which are commonly referred to as direct broadcast satellite (DBS), may incorporate ITV capabilities via use of out-of-band signaling methods made possible through the public switched telephone network (PSTN), or other similar upstream signaling mechanism. Accordingly, it is to be appreciated that the principles and teachings of the present invention are applicable to any video distribution system having ITV capabilities including those which have been described hereinabove.

Each programming source is allocated within the network and made available to the end user as a selective entity that is designated as a channel. Thus, multiple programming sources that are made concurrently available to the user over the network, are selectively accessible by the user using the well known process of changing channels. When carried on in a relatively rapid manner, the aforedescribed phenomenon of "channel surfing" occurs. Typically, this occurs when the user is simply changing channels in hopes of finding something interesting to watch. Because content that is currently viewed during the channel surfing operation has already been in progress for some predetermined amount of time, a portion of that particular program has been missed by a user.

Figure 2:
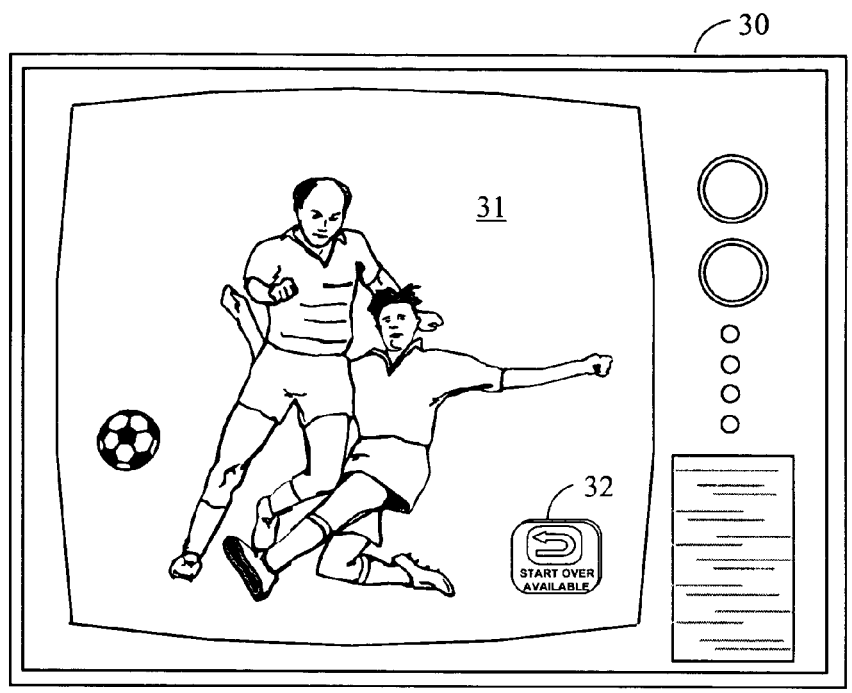
FIG. 2 is a front elevational view of a conventional television that is currently showing a partially elapsed video program, wherein a graphical, start over icon is overlaid thereon.

FIG. 2 shows a television 30 exhibiting a screen-shot 31 of a sample channel which has been recently accessed by a user, wherein the program has partially elapsed. A partially elapsed program is defined as a video program having a predetermined run time that has begun play over a specified channel without having fully elapsed through the entire run time thereof. A start over icon 32 incorporating an embodiment of the present invention is shown on the display screen of the television set, which prompts the user to press a particular key on the remote 17 if replay of the presently viewed video program from start is desired. The start over icon 32 is preferably a small, graphical image that overlaid or embedded in the existing moving video image, somewhere on the display so as not to severely impair viewing of the video image, yet sufficiently prominent to alert the user that the start over system is available for use. The start over icon is preferably a momentary button that is displayed on the screen for a predetermined period of time, defining an icon persistency time, following a switch to that particular channel. The icon persistency time is preferably set by a CATV provider to a range of approximately 5 to 20 seconds, wherein it is believed that this range of time offers optimal amount of time for a typical user to react to the start over system offering without encumbering the user's viewing experience. Following this time, the icon will be removed from the screen and the start over system will be disabled for that particular channel. Re-enablement of the start over system for that particular channel is then only accomplished by switching to a different channel and then switching back to the present channel. Thus, there are two principle conditions which must exist for the start over icon 32 to be shown on the television display. The start over icon will only be shown on the display if the particular program is a partially elapsed program.

The key on the remote 17, which is used for actuation for the start over feature, may exist as a dedicated key whose only functionality is to actuate the start over feature. In this case, a relatively small icon representative indicia may be imprinted on the upper surface of the key in order to facilitate ease of recognition by the user. Alternatively, the key on the remote may exist as a defined key, wherein any key commonly implemented on a conventional remote may be designated for use with the start over feature. Examples of such a defined key may be any numeric key, or either of the "up", "down", "left", or "right" keys disposed on the remote 17. Nevertheless, it is to be appreciated by those skilled in the art any type of user input device may be implemented for initiating the start over feature, wherein several examples include a button mounted on the front panel of the STB, or even a key on the keyboard of a personal computer that is interconnected to the STB.

The overlaid graphical image is created by an on-screen display (OSD) generator algorithm, which exists as a portion of the controller of the present invention. The OSD generator is operable to display the graphical image on top of the resulting raster image of the video program that is displayed on the television. Alternatively, if the OSD portion of the controller is executed from the head end, the graphical image may be embedded in the raster image of the video program. An embedded graphical image is defined as an image that is superimposed on the raster image of the video program such that only one television signal is sent to the display device. Conversely, a overlaid graphical image is defined as an image which is forwarded to the display device independently of the raster image of the video program.

Optionally, another condition for display of the start over icon 32 is disclosed, wherein individual channels, or individual video programs may be start over enabled or disabled by the CATV provider or by the programming source, thereby defining a start over enablement feature. That is, an entire channel may be configured to allow the start over system on all of its programs, or conversely disallowed from the use thereof. Further, individual programs may be enabled/disabled from use of the start over system. For example, some programming sources may not wish to have their programs played at any time other than at the prescribed schedule. Given this case, the programming source would have means to disable the start over system using an in-band, downstream signaling technique (to be described later). Other examples include programming sources having a programming schedule made up of predominantly instantaneous news reporting, yet interspersed with special interest news clips having a predetermined run time. Whereas the start over feature would not make sense for use with the instantaneous news report content, special interest news clips having information that is conveyed to the user that is developed throughout the run-time thereof, directly lend themselves for use with the start over system.

One aspect of the optional start over enablement feature is that the CATV provider has an efficient means of managing the storage requirements for the start over system within a video distribution network having a video storage device of limited storage capacity. Because modern video distribution systems typically offer over several hundred channels, providing the start over system for all programming sources or channels would unduly tax the storage capacities of most commonly used disk arrays. The start over enablement feature supplies a solution to this need by allowing the CATV provider to choose all of the available channels, or only a subset of available channels to be provided with the start over system.

Figure 3:
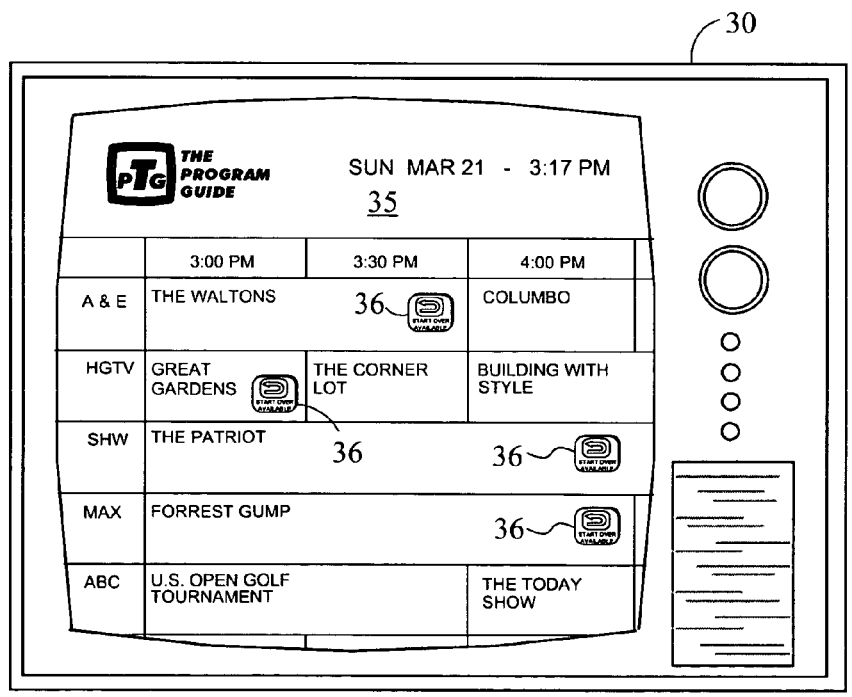
FIG. 3 is a front elevational view of a conventional television that is currently showing a conventional electronic programming guide (EPG), wherein several partially elapsed video programs each have a graphical, start over icon overlaid thereon, thereby exhibiting that the start over system is available for use with that particular video program.
Figure 4:
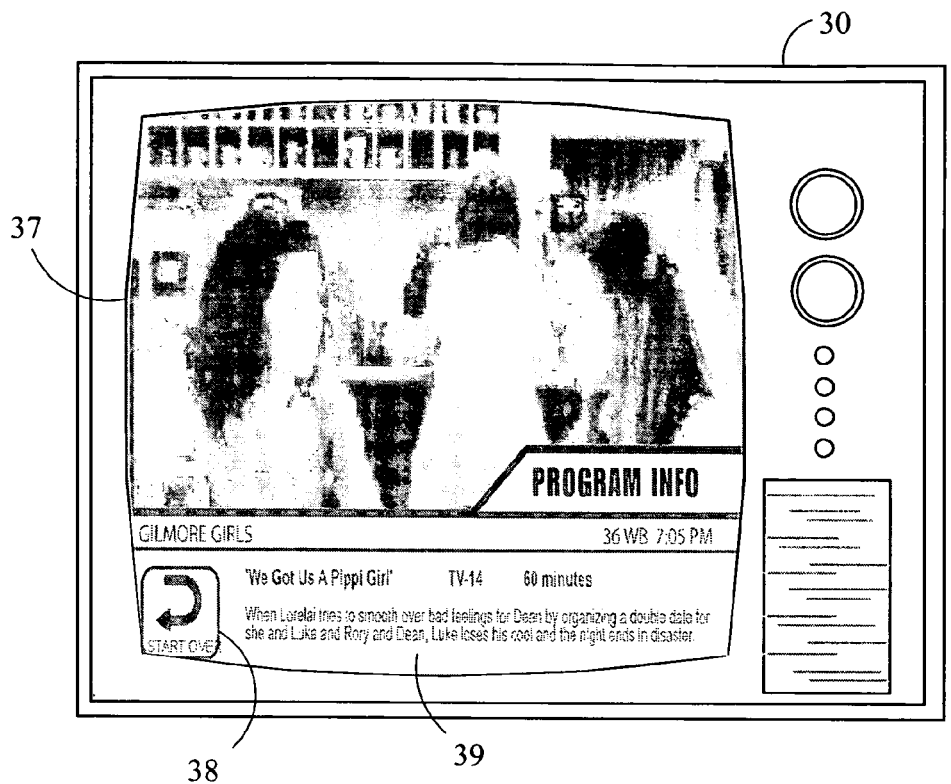
FIG. 4 is a front elevational view of a conventional television having a broadcast program shown thereon, wherein the star over icon exists as a portion of a detailed description overlay bar.
Figure 5:
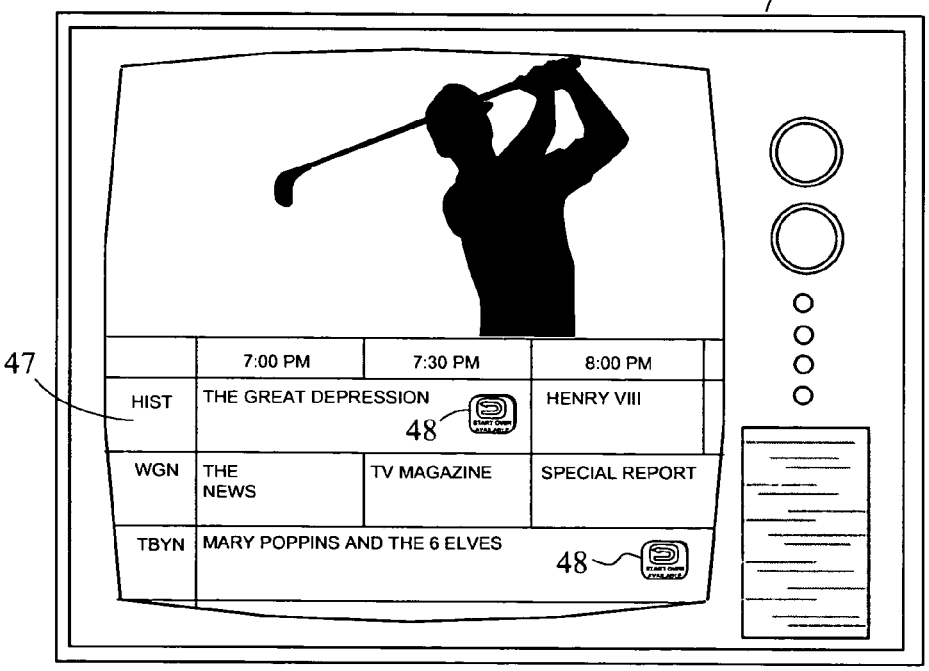
FIG. 5 is a front elevational view of a conventional television having a broadcast program currently being shown thereon, wherein a partial electronic programming guide has several start over icons embedded on several corresponding cells thereof.

Optionally, the start over icon may also be provided in conjunction with a conventional full screen electronic program guide (EPG) as shown in FIG. 3. An exemplary EPG screen 35 is shown having a grid-like display of five rows depicting the programming schedules for five associated programming sources. Each row has a multiple of cells of varying length, wherein the first cell of the left-most column contains information regarding the name of the programming source. Successive cells indicate individual programs that are aligned vertically according to their respective time slots. As shown, graphical start over icons 36 are shown embedded or overlaid upon several of the program cells in which the start over feature is enabled. As is well known in the art, any number of operations may be supplied to the user in order to enable operation of the start over feature from within an EPG screen; one exemplary method contemplates a dedicated button on the remote, which may be pressed if the user wishes to view the desired partially elapsed program from the beginning thereof. Alternatively, the start over icon 38 may be presented to the user as an embedded or overlaid icon upon a conventional information bar 39 as shown in FIG. 4. Yet another alternative contemplates a start over icon 48, which is embedded or overlaid upon cells within a partial grid electronic program guide 47 as shown in FIG. 5. As shown, an ongoing broadcast video program 37 is shown with a detailed description bar overlay 39 overlaying the bottom portion thereof. Thus, the previous two examples show several means of providing interactive notification to the user that the start over feature is available for a particular program.

Currently, most digital cable distribution systems utilize MPEG-2 transport techniques to deliver digital video over hybrid fiber coaxial architectures. It is well known to those familiar with the art that there are several techniques that are available for delivering program and channel information to the receiving device in order for the receiving device to become aware of what channels currently exist on the network and what programs are associated with those channels. On the in-band path there are two primary protocols; first the Program Specific Information (PSI) data is used to define what services are contained within each multiplexed HFC cable. The PSI data contains several information tables that the receiving device will use to determine the appropriate PID values in which to extract data for each program within the transport stream. These information tables are; Program Association Table (PAT) and Program Map Table (PMT) which are used to correlate specific program numbers within the transport stream to specific PIDs values, such as the video and audio PIDs for the desired video program. The second in-band protocol which is optionally used by cable systems is the Program and System Information Protocol (PSIP). PSIP information defines the programming within an aerial broadcast system and will be modified by CATV provider to reflect the new position of the program as it relates to the frequency distribution within the CATV provider's system as opposed to its original over-the-air location.

Several pieces of information are also distributed to the receiving device via the downstream out-of-band (OOB) path which is used by the receiving device to define the available channels on the network. The first OOB information is Service Information (SI) or Network Information Table (NIT) which provides the virtual channel map information to the receiving device. This table relates program channel numbers to specific distribution frequencies on the cable network. Secondly proprietary data is also delivered OOB to support Electronic Program Guides (EPG) that exists on receiving devices. This information enables the EPG to display an on screen guide that presents to the user all the programs currently available on the network as well as their associated virtual channel numbers. In some cases this proprietary program guide data is delivered via an in-band channel whereby the STB would tune to a specified in-band channel and extract the program data from the MPEG transport stream.

The channel and program data mentioned above is coordinated by the delivery network, as such, it is well known to the delivery network. In addition, as video programs are stored within the network to support the "minimally interactive" start over solution, it should be categorized in such a way as to be consistent with at least one component of the information that is delivered to the receiving device, such as Program Name. By utilizing at least one common element the receiving device can deliver upstream to the head end this common indicator so the head end understands exactly which program the receiving device wishes to start from the beginning.

As hereinbefore described, the head end is operable to receive programs from the various programming sources and transmit the plurality of program offerings to the plurality of users through the video distribution network. In accordance with the present invention, video programs are stored in the program storage as well as forwarded to clients in the network. This is accomplished by parsing the channel and program data of each incoming video stream of a programming source in order to determine the start of a new program. When a new program name has been detected, storage is allocated in the video storage device 21 via the video server 20, and an entry is added to a lookup table 40 contained in the video server manager 22. FIG. 6 shows a partial list of program names that are contained within the exemplary lookup table 40. Coupled with each program name entry 41 are several other fields, such as the programming source channel 42, and a currently accessed flag 43.

Each entry will remain persistent in the lookup table as long the program is partially elapsed or the currently accessed flag 43 is true (e.g. logic "1"). The currently accessed flag is set to true whenever a client (user) in the network is currently accessing the video program that is stored on the storage device, thereby defining a stored video program; if not, the currently accessed flag is set to false (e.g. logic "0"). The system constantly monitors the PID fields of the incoming video streams of each programming channel to determine if the particular program is partially elapsed. Whenever both currently accessed flag, and the program name field of the particular programming source changes, the program name entry is removed from the lookup table and the stored video program removed from the video storage device.

Optionally, the start over system may also include provisions to allow the programming source and/or CATV provider to determine what video programs, if any, are to be start over enabled. That is, the system may be configured to allow only a subset of available programming sources or individual video programs to be enabled for use with the start over system. This utility is accomplished by providing a pair of optional start over enablement tables that preferably reside in the program and database storage 23 and are accessible by the video server manager 22. Nevertheless, it is to be appreciated that the pair of tables may reside in any portion of the network such as in storage means within individual STBs 13 within the network 10 and controlled by the processing system therein.

A pictorial representation of the programming source start over enablement table and program name start over enablement table are shown in FIGS. 7a and 7b respectively. The entries within a programming source start over enablement table 45 may be updated by the CATV provider, and serve to limit the use of the start over system to those programming sources or channels that are included therein. The program name start over enablement table 46 contains a list of individual video programs for which the start over system is enabled; accordingly, only individual video programs contained therein are enabled for use by the start over system. The entries in the program name start over enablement table 46 are perennially persistent and is only updated/modified by the CATV provider or by the programming source. While control of either table by the CATV provider is accomplished via modification of the aforementioned tables maintained locally at the head end, control and manipulation of either table by the programming source must be accomplished via information sent within the data stream of the incoming video stream. Preferably, this information is sent from the programming source to the server using a field of the MPEG-2 packet. The user portion of the incoming video stream of the MPEG-2 packet contains a user bit, which when parsed, is operable by the start over system to add the associated program ID to the lookup table 40. That is, if the user bit is set to "true", start over functionality is allowed for that particular program source or channel and thus added to the table. When the start over system obtains receipt of a new program name, either or preferably both of these tables (45, and 46) are consulted to verify that both the programming source and program name allow start over functionality thereof. If not, the video program is not stored in the video server 20 while passing through the head end 11.

Figure 8:
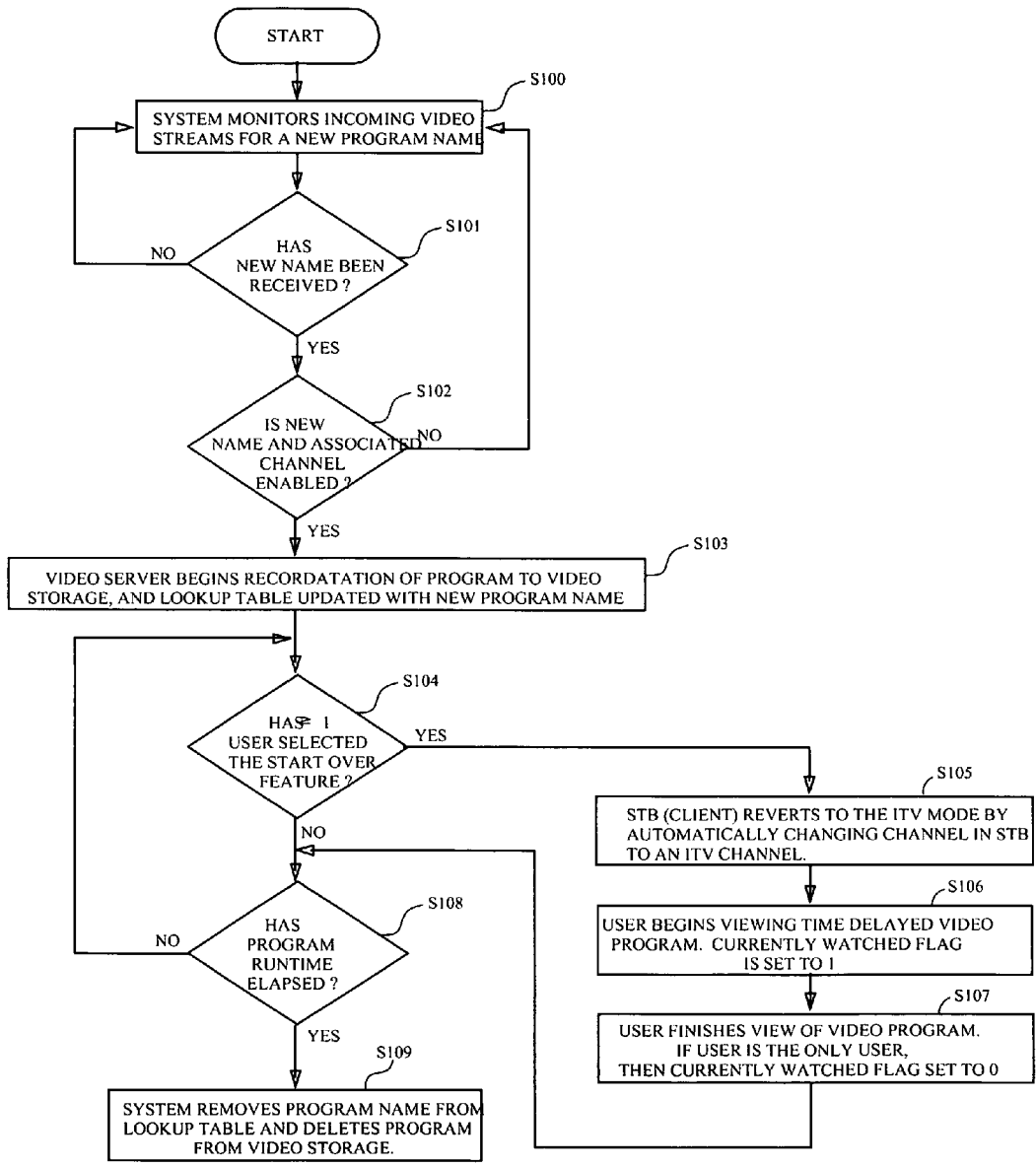
FIG. 8 is a flow diagram of a method for providing the start over system on a typical video distribution system having interactive television capabilities.

FIG. 8 shows a flow diagram of the steps involved in a method for realizing the start over system of the present invention. The method may be embodied as a program of instructions, defining a controller, that are executed by a micro-processor located in the STB (client) or head end (server). Alternatively, the steps of the program may be executed on the STB as well as the head end wherein the processing responsibilities are shared therebetween. The system initially causes the head end to monitor incoming video streams (step 100) in a polling fashion until a new program name has been recovered therefrom (step 101). In practice, the head end may receive numerous new program names within a relatively short time frame, and subsequently pass multiple recordation requests to the video server 20. It is also important to note that the video server is simultaneously capable of recording a plurality of video programs as well as playing a plurality of video programs in a concurrent manner. When a new program name has been detected by the system, it may optionally be compared against a programming source start over enablement table 45 or a program name start over table 46 located within the video server manager 22 (step 102). Preferably, both types of tables are existent and the system compares both the program name and associated programming source or channel to insure that the particular video program is start over enabled. If either the program name or associated channel does not have an entry in its respective table (45, and 46), processing of that particular program name has ceased and control reverts back to step 100.

The system then instructs the video server 20 to begin recordation of the entire video program and updates the lookup table 40 with the new program name information (step 103). After some period of time, the user may become cognizant of the partially elapsed video program via either changing to that particular channel or by browsing through the EPG. If this is the case and the user wishes to view the entire video program from start, the dedicated or embedded button on the remote control device 17 is actuated (step 104). Next, the STB 13 reverts to the ITV mode, wherein a dedicated connection is established with the head end in order to begin receipt of the stored video program from the video server 20 (step 105) using commonly known ITV techniques. Because the current status of the STB is in an ITV mode, features that are commonly associated with an ITV system may be utilized such as pause, fast-forward, fast-rewind, stop, and the like. The user then begins viewing the stored video program in the normal manner, albeit in a time delayed fashion from the original time slot alloted by the programming source (step 106). The user may view the entire program through to its completion or may optionally stop play thereof prematurely. If the user chooses to view the entire program, the system is blocked from inadvertent deletion of the stored video program from the video storage by the setting of the currently accessed flag 43. However, when the user has completed view of the selected program, the system checks for other users that could also be watching the same program, and thus only resets the currently accessed flag to "false" if no remaining users are watching that particular time delayed video program (step 107).

If all remaining users have completed view of the stored video program, or no user within the network has requested view of the program from start, the system will still monitor the incoming video stream in a polling fashion until the broadcast video program has totally elapsed (step 108). This allows users a maximum window of opportunity for view of the program in its entirety, regardless of what portion of the program has been missed. Once the program has totally elapsed and no further users are accessing the stored version thereof, the system instructs the video server to delete the stored video program from video storage and removes the program name and associated information from the lookup table (step 109).

Alternatively the start over system may be enabled for use with video programs transmitted over other network mediums such as the internet. The present invention provides enhanced utility over presently known start over systems in that only one button is required to enact reversion to play of the program from the start thereof. Although well known video players exist for use with internet coupled devices such a personal computer, these video players require a multiple step procedure for enacting the start over mechanism. The present invention on the other hand, provides advantage by requiring only a 1 step procedure for enacting the start over feature on a partially elapsed video program. This one step procedure encounters the dedication of a key of the keyboard of the client device. Thus, the user may, if so desired, revert to the start of a partially elapsed video program by simply pressing one key on the client's keyboard.

An alternative embodiment of the present invention contemplates a VOD start over system which is operable on video programs that are accessed by the user in VOD mode. The VOD start over system is similar to the previous embodiment in that a storage device is existent for the storage of said stored video programs, interactive control by the user is provided by an embedded or overlaid graphical icon, and an input means for input by the user, and a controller for causing reversion to the start of the video program upon request from the input means. The only difference being that a VOD video program is enabled for start over viewing in lieu of the broadcast video program of the previous embodiment. Thus, with the present arrangement, no requirements exist for the storage of incoming broadcast video programs onto the storage device; virtually all VOD video programs are already existent therein. Another key difference from the previous embodiment is that the stored video program is never deleted from the storage device. A user may thus begin view of a VOD program, and if so desired during the play thereof, revert back to play from the beginning of the program using only a defined or dedicated button on the remote control device.

Although the present invention has been disclosed with a certain degree of particularity, it should be recognized that various elements thereof may be altered by persons skilled in the art without departing from the spirit and scope of the invention. For example, it is well known that individual video program information may be derived from an accompanying EPG database. Thus, the system as in step 100 of FIG. 8 may utilize the start time of a video program as stored in the EPG to initiate recordation thereof to video storage. Consequently, the completion time of the video program may be obtained therefrom as well. Thus, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a video storage device configured to record a plurality of video programs received from at least one programming source; and
    a controller, in communication with the video storage device, configured to:
        determine whether to record a video program based on information included with the video program from the at least one programming source, the information indicating whether the apparatus is permitted to record the video program,
        cause the video storage device to record the video program when the video program is being received by the apparatus from the at least one programming source,
        independently provide the recorded video program to each of a plurality of client devices requesting replay of the video program from its beginning,
        update a flag corresponding to the recorded video program in response to providing the recorded video program to one of the plurality of client devices, the flag indicating that one or more of the plurality of client devices is accessing the recorded video program,
        update the flag in response to determining that none of the plurality of client devices is accessing the recorded video program,
        determine whether a runtime of the video program has elapsed, and
        remove the recorded video program from the video storage device based on the flag and in response to determining that the runtime of the video program has elapsed.

2. The apparatus of claim 1, wherein:
    determining whether a runtime of the video program has elapsed comprises determining whether the at least one programming source is broadcasting the video program at a time of the determining whether the runtime of the video program has elapsed.

3. The apparatus of claim 1, wherein the controller is configured to cause the video storage device to record the video program only during the runtime.

4. The apparatus of claim 1, wherein the apparatus is configured to communicate with the plurality of client devices via a distribution network.

5. The apparatus of claim 1, wherein the controller is further configured to transmit a graphical icon with the video program, the graphical icon indicating that replay of the video program from its beginning is available.

6. The apparatus of claim 1, wherein the controller is further configured to simultaneously receive a plurality of requests to replay the video program from its beginning from the plurality of client devices.

7. The apparatus of claim 5, wherein the graphical icon is transmitted with the video program independently of a raster image of the video program.

8. The apparatus of claim 5, wherein said graphical icon is embedded in a raster image of the video program.

9. The apparatus of claim 1, wherein the controller is further configured to transmit a graphical icon with an electronic programming guide, the graphical icon indicating that replay of the video program from its beginning is available.

10. The apparatus of claim 1, wherein the controller is further configured to transmit a graphical icon overlaid upon a portion of an electronic programming guide, the graphical icon indicating that replay of the video program from its beginning is available.

11. The apparatus of claim 1, wherein the controller is further configured to transmit a graphical icon overlaid upon a portion of an information bar, the graphical icon indicating that replay of the video program from its beginning is available.

12. A network comprising:
a video storage device configured to record a plurality of video programs received from at least one programming source;
a first controller, in communication with said video storage device, configured to:
determine whether to record a video program based on information included with the video program from the at least one programming source, the information indicating whether the video storage device is permitted to record the video program,
cause the video storage device to record the video program, and
determine whether the video program is still being received by the video storage device;
a plurality of client devices each configured to operatively couple the video storage device to a corresponding display, and to present the plurality of video programs and the recorded video program on the corresponding display; and
a second controller, in communication with coupled to each of the plurality of client devices, the second controller configured to:
independently provide the recorded video program to each of the plurality of client devices requesting replay of the video program from its beginning,
update a flag corresponding to the recorded video program in response to providing the recorded video program to one of the plurality of client devices, the flag indicating that one or more of the plurality of client devices is accessing the recorded video program,
update the flag in response to determining that none of the plurality of client devices is accessing the recorded video program,
determine whether a runtime of the video program has elapsed, and
remove the recorded video program from the video storage device based on the flag and in response to determining that the runtime has elapsed.

13. The network of claim 12, wherein:
determining whether a runtime of the video program has elapsed comprises determining whether the at least one programming source is broadcasting the video program at a time of the determining whether the runtime of the video program has elapsed.

14. The network of claim 12, wherein each of the plurality of client devices is further configured to receive a graphical icon for presentation on the corresponding display, and to revert from presenting the video program to presenting the recorded video program from its beginning when the graphical icon is selected.

15. The network of claim 14, wherein each of the plurality of client devices is further configured to receive a selection of the graphical icon from a remote control device.

16. The network of claim 14, wherein each of the plurality of client devices is configured to present the graphical icon over the video program.

17. The network of claim 14, wherein each of the plurality of client devices is configured to present the graphical icon over a portion of an electronic programming guide.

18. The network of claim 14, wherein each of the plurality of client devices is configured to present the graphical icon over a portion of an information bar.

19. The network of claim 12, wherein the first controller is further configured to select a subset of available programming sources from which to record the video program in the video storage device.

20. The network of claim 12, wherein the first controller is further configured to select a subset of the plurality of the video programs for recording in the video storage device.

21. The network of claim 12, wherein the video storage device exists in a head end.

22. A method comprising:
recording, on a storage device, at least one video program of a plurality of video programs received from at least one programming source in response to determining that the storage device is permitted to record the at least one video program based on information received with the at least one video program;
transmitting, from the storage device, the at least one recorded video program to any of a plurality of client devices to play the at least one recorded video program from its beginning;
updating a flag corresponding to the at least one recorded video program in response to transmitting the at least one recorded video program, the flag indicating that one or more of the plurality of client devices is accessing the at least one recorded video program;
updating the flag in response to determining that presentation of the at least one recorded video program is complete and none of the plurality of client devices is accessing the at least one recorded video program;
determining whether a runtime of the at least one video program has elapsed; and
removing the at least one recorded video program from the storage device based on the flag and in response to determining that the runtime of the at least one video program has elapsed.

23. The method of claim 22, wherein:
determining whether a runtime of the at least one video program has elapsed comprises determining whether the at least one video program is being received by the storage device from the at least one programming source.

24. The method of claim 22, wherein the at least one programming source comprises a plurality of programming sources, the method further comprising:
selecting a subset of the plurality of programming sources from which to record the at least one video program on the storage device.

25. The method of claim 22, wherein the at least one video program comprises a plurality of video programs, the method further comprising:
selecting a subset of the plurality of video programs to record on the storage device.

26. The method of claim 22, further comprising:
generating a graphical icon indicating that replay of the at least one video program from its beginning is available; and
transmitting the graphical icon to the plurality of client devices.

27. The method of claim 26, wherein the graphical icon is transmitted with the at least one video program.

28. The method of claim 26, wherein generating the graphical icon comprises embedding the graphical icon in the at least one video program.

29. The method of claim 26, wherein transmitting the graphical icon comprises transmitting the graphical icon independently of the at least one video program.

30. The method of claim 26, wherein transmitting the graphical icon comprises transmitting the graphical icon overlaid upon a portion of an electronic programming guide.

31. The method of claim 26, wherein transmitting the graphical icon comprises transmitting the graphical icon overlaid upon a portion of an information bar.

32. The method of claim 22, further comprising:
receiving a request to play the at least one recorded video program, the request comprising a content identifier associated with the at least one recorded video program.

33. A method comprising:
receiving a video program from at least one programming source;
recording the video program on a storage device;
receiving a request from a client device to present the video program from its beginning;
reverting play of the video program by transmitting the recorded video program configured to be played from the beginning thereof;
updating, by a computing device, a flag corresponding to the recorded video program in response to transmitting the recorded video program, the flag indicating that one or more of a plurality of client devices is accessing the recorded video program;
updating, by the computing device, the flag in response to determining that presentation of the recorded video program is completed and none of the plurality of client devices is accessing the recorded video program;
determining whether a runtime of the video program has elapsed; and
removing the recorded video program from the storage device based on the flag and in response to determining that the runtime of the video program has elapsed.

34. A method, comprising:
receiving, at a computing device having a storage device, a video program having a predetermined broadcast window from a content source;
determining whether to record the video program based on information included with the video program from the content source, the information indicating whether the computing device is permitted to record the video program;
recording the video program on the storage device upon receiving the video program in response to determining that the video program is to be recorded;
broadcasting the video program to a plurality of client devices;
transmitting, by the computing device, the recorded video program to a particular client device in response to receiving a request to play the video program from its beginning from the particular client device;
updating, by the computing device, a flag corresponding to the recorded video program in response to transmitting the recorded video program to the particular client device, the flag indicating that one or more of the plurality of client devices is accessing the recorded video program;
updating, by the computing device, the flag in response to determining that the particular client device has completed presentation of the recorded video program and none of the plurality of client devices is accessing the recorded video program;
determining whether the predetermined broadcast window has ended; and
removing the recorded video program from the storage device based on the flag and in response to determining that the predetermined broadcast window has ended.

35. The method of claim 34, further comprising transmitting a graphical icon to the plurality of client devices, the graphical icon indicating that replay of the video program from its beginning is available.

36. The method of claim 34, wherein broadcasting the video program to the plurality of client devices comprises establishing a video stream between the content source and the plurality of client devices, and wherein transmitting the recorded video program to the particular client device comprises establishing a video stream between the storage device and the particular client device.

37. The method of claim 36, wherein transmitting the recorded video program to the particular client device comprises disconnecting the content source from the particular client device.

38. The method of claim 34, further comprising:
configuring a graphical icon to be presented for a persistency time following a moment at which a client device tunes to the video program, the graphical icon indicating that replay of the video program from its beginning is available.

39. The method of claim 34, further comprising:
configuring a graphical icon to be presented in response to a client device tuning to the video program after the video program has partially elapsed, the graphical icon indicating that replay of the video program from its beginning is available.

* * * * *

UNITED STATES PATENT AND TRADEMARK OFFICE
CERTIFICATE OF CORRECTION

| | | |
|---|---|---|
| PATENT NO. | : 8,707,376 B1 | Page 1 of 1 |
| APPLICATION NO. | : 11/186170 | |
| DATED | : April 22, 2014 | |
| INVENTOR(S) | : Sandi Hannum et al. | |

It is certified that error appears in the above-identified patent and that said Letters Patent is hereby corrected as shown below:

In the Claims,

Column 13, Line 30:
In claim 12, after "with", delete "coupled to"

Signed and Sealed this
Thirtieth Day of June, 2015

Michelle K. Lee
*Director of the United States Patent and Trademark Office*